(12) United States Patent
MacKinnon et al.

(10) Patent No.: US 8,003,732 B2
(45) Date of Patent: Aug. 23, 2011

(54) GRADIENT REINFORCED PROTON EXCHANGE MEMBRANE

(75) Inventors: Sean M MacKinnon, Fairport, NY (US); Michael R. Schoeneweiss, W. Henrietta, NY (US); Timothy J. Fuller, Pittsford, NY (US); Craig S. Gittleman, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 489 days.

(21) Appl. No.: 12/197,874

(22) Filed: Aug. 25, 2008

(65) Prior Publication Data

US 2010/0047657 A1 Feb. 25, 2010

(51) Int. Cl.
*C08F 214/14* (2006.01)
(52) U.S. Cl. ........... 525/326.2; 526/250; 526/252; 526/253; 526/254; 525/199; 525/200; 521/27
(58) Field of Classification Search .......... 525/199, 525/200, 326.2; 526/250, 252, 253, 254; 521/27
See application file for complete search history.

(56) References Cited

U.S. PATENT DOCUMENTS

| | | | |
|---|---|---|---|
| 5,006,408 A * | 4/1991 | Green et al. ............ 428/395 |
| 5,021,602 A | 6/1991 | Clement et al. |
| 5,037,917 A | 8/1991 | Babb et al. |
| 5,066,746 A | 11/1991 | Clement et al. |
| 5,159,037 A | 10/1992 | Clement et al. |
| 5,159,038 A | 10/1992 | Babb et al. |
| 5,910,378 A | 6/1999 | Debe et al. |
| 6,124,060 A | 9/2000 | Akita et al. |
| 6,183,668 B1 | 2/2001 | Debe et al. |
| 6,277,512 B1 | 8/2001 | Hamrock et al. |
| 6,444,343 B1 | 9/2002 | Prakash et al. |
| 6,523,699 B1 | 2/2003 | Akita et al. |
| 6,559,237 B1 | 5/2003 | Mao et al. |
| 6,847,518 B2 | 1/2005 | Fukuda et al. |
| 6,875,537 B2 | 4/2005 | Tani et al. |
| 6,926,984 B2 | 8/2005 | Asano et al. |
| 6,933,068 B2 | 8/2005 | Asano et al. |
| 6,953,653 B2 | 10/2005 | Smith et al. |
| 6,986,962 B2 | 1/2006 | Oyanagi et al. |
| 7,001,929 B2 | 2/2006 | Goto et al. |
| 7,045,241 B2 | 5/2006 | Akita et al. |
| 2001/0018144 A1 | 8/2001 | Watakabe et al. |
| 2002/0014405 A1 | 2/2002 | Arcella et al. |
| 2003/0017379 A1 | 1/2003 | Menashi |
| 2004/0214058 A1 | 10/2004 | Tada et al. |
| 2004/0214065 A1 | 10/2004 | Kanaoka et al. |
| 2005/0014927 A1 | 1/2005 | Akita |
| 2005/0043487 A1 | 2/2005 | Felix et al. |
| 2005/0048342 A1 | 3/2005 | Wakahoi et al. |
| 2005/0053810 A1 | 3/2005 | Kato et al. |
| 2005/0058864 A1 | 3/2005 | Goebel |
| 2005/0064260 A1 | 3/2005 | Otsuki et al. |
| 2005/0100770 A1 | 5/2005 | Sugawara et al. |
| 2005/0106440 A1 | 5/2005 | Komiya |
| 2005/0116206 A1 | 6/2005 | Kakuta et al. |
| 2005/0130024 A1 | 6/2005 | Otsuki et al. |
| 2005/0142397 A1 | 6/2005 | Wakahoi et al. |
| 2005/0143530 A1 | 6/2005 | Iwadate et al. |
| 2005/0175886 A1 | 8/2005 | Fukuda et al. |
| 2005/0197467 A1 | 9/2005 | Komiya et al. |
| 2005/0227138 A1 | 10/2005 | Fukuda et al. |
| 2005/0233181 A1 | 10/2005 | Wariishi et al. |
| 2005/0260474 A1 | 11/2005 | Asano et al. |
| 2006/0019147 A1 | 1/2006 | Fukuda et al. |
| 2006/0127728 A1 | 6/2006 | Otsuki et al. |
| 2006/0177719 A1 | 8/2006 | Fuller et al. |
| 2007/0042242 A1 | 2/2007 | Tada et al. |
| 2007/0099054 A1 | 5/2007 | Fuller et al. |
| 2007/0141237 A1 | 6/2007 | Okiyama et al. |
| 2008/0027152 A1 * | 1/2008 | Maier et al. ............ 521/25 |
| 2009/0278083 A1 | 11/2009 | Fuller et al. |
| 2009/0278091 A1 | 11/2009 | MacKinnon et al. |
| 2009/0281245 A1 | 11/2009 | MacKinnon et al. |
| 2009/0281262 A1 | 11/2009 | MacKinnon et al. |
| 2009/0281270 A1 | 11/2009 | Fuller et al. |

FOREIGN PATENT DOCUMENTS

| | | |
|---|---|---|
| JP | 2003535929 T | 12/2003 |
| JP | 2005129298 A | 5/2005 |
| JP | 2005166557 A | 6/2005 |
| JP | 2005179380 A | 7/2005 |
| JP | 2009 249 487 A | 10/2009 |
| WO | 2004/051776 | 6/2004 |
| WO | 2007/052954 A1 | 5/2007 |

OTHER PUBLICATIONS

Smith, D.W. et al., "Perfluorocyclobutane Aromatic Polyethers. Synthesis and Characterization of New Siloxane-Containing Fluoropolymers," Macromolecules 1996, v. 29, pp. 852-860.

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

* cited by examiner

*Primary Examiner* — Bernard Lipman
(74) *Attorney, Agent, or Firm* — Brooks Kushman P.C.

(57) ABSTRACT

An ion conducting polymeric structure suitable for fuel cell applications is provided. The polymeric structure comprises a non-homogenous polymeric layer. The non-homogeneous layer is a blend of a first polymer comprising cyclobutyl moiety; and a second polymer having a non-ionic polymer segment. The weight ratio of the first polymer to the second polymer varies as a function of position within the non-homogenous layer. The blend composition may be cast into an electrolyte membrane that can be used to prepare electrochemical cells such as batteries and fuel cells.

20 Claims, 6 Drawing Sheets

GRADIENT REINFORCED PROTON EXCHANGE MEMBRANE

TECHNICAL FIELD

The field to which the disclosure generally relates includes polymer electrolytes, electrolyte membranes and fuel cells.

BACKGROUND

A polymer electrolyte can be readily processed into a thin membrane which is useful as a separator and ionic conductor in electrochemical cells. Polymer electrolyte membranes have been used in electrolysis, batteries and fuel cells. To further increase the current density and energy density in an electrochemical cell, polymer electrolyte with high ionic conductivity and ion exchange capacity is desired. Polymer electrolytes with high ion exchange capacity, however, typically suffer from poor mechanical properties, especially at high relative humidity. Some of the hydrocarbon electrolytes and perfluoropolymer electrolytes also suffer from mechanical degradation after many repeated humidity cycles leading to irrecoverable performance losses. Incorporating a reinforcing nonionic polymer into a polymer electrolyte results in lower ion exchange capacity. As the nonionic polymer is not usually compatible with a polymer electrolyte, a blend of nonionic polymer with a polymer electrolyte may have inferior mechanical properties. There is thus a need to improve the mechanical properties of a polymer electrolyte membrane without compromising its electrochemical performance.

SUMMARY OF EXEMPLARY EMBODIMENTS OF THE INVENTION

The present invention solves one or more problems of the prior art by providing in at least one embodiment an ion conducting polymeric structure suitable for fuel cell applications. The polymeric structure comprises a non-homogenous polymeric layer. The non-homogeneous layer is a blend of a first polymer comprising cyclobutyl moiety; and a second polymer having a non-ionic polymer segment. The weight ratio of the first polymer to the second polymer varies as a function of position within the non-homogenous layer. The blend composition may be cast into an electrolyte membrane that can be used to prepare electrochemical cells such as batteries and fuel cells. Advantageously, the spatially varying properties can be spatially tailored to meet the spatially varying requirement of a fuel cell regarding durability.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
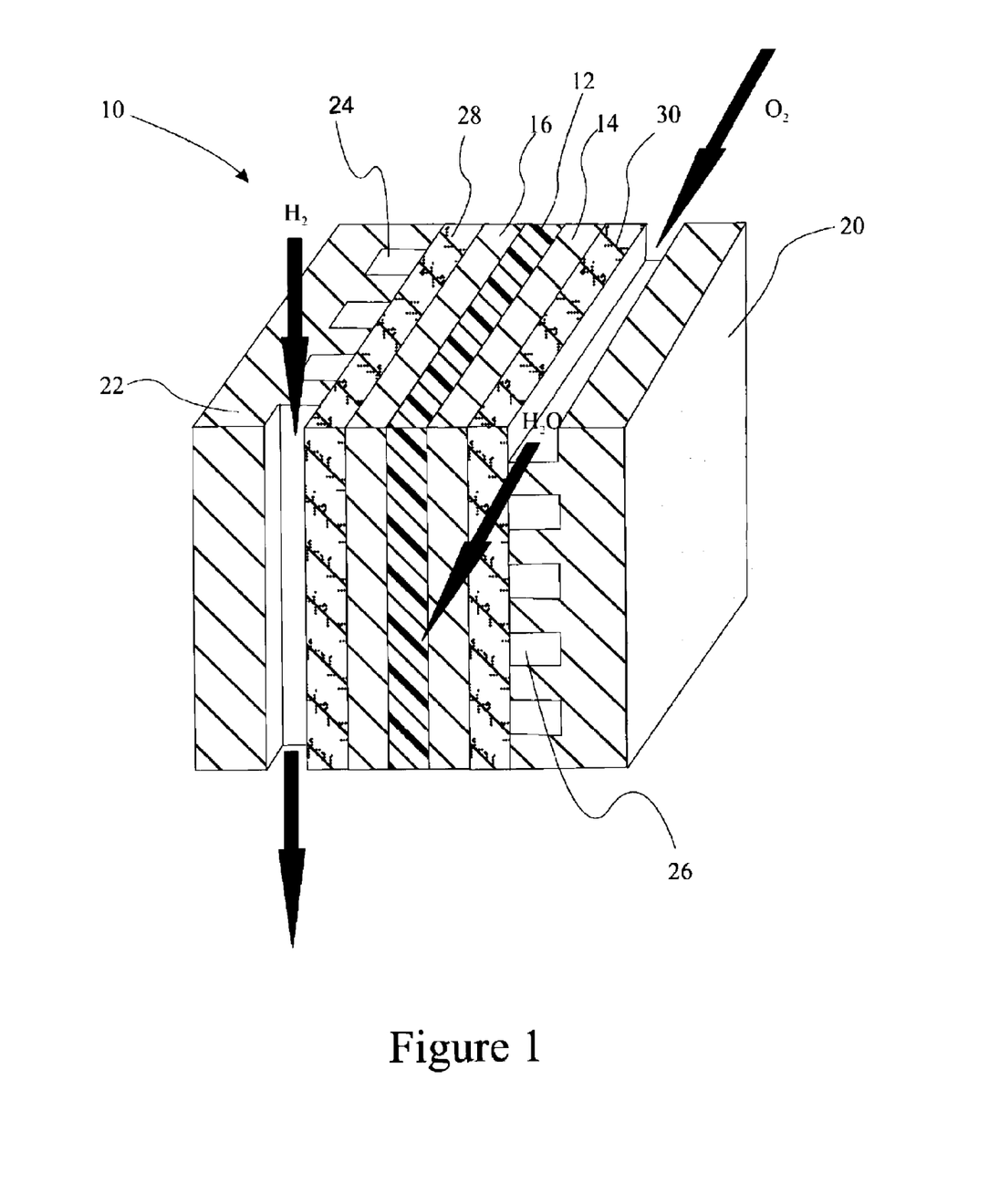
FIG. 1 provides a schematic illustration of a fuel cell incorporating the polymers of an embodiment of the present invention.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive membrane 12 includes one or more of the polymers set forth below. Fuel cell 10 also includes conductive plates 20, 22, gas channels 24 and 26, and gas diffusion layers 28 and 30.

In an embodiment of the present invention, an ion conducting polymeric structure suitable for fuel cell applications is provided. The polymeric structure comprises a non-homogenous polymeric layer. The non-homogeneous layer is a blend of a first polymer comprising cyclobutyl moiety; and a second polymer having a non-ionic polymer segment. The weight ratio of the first polymer to the second polymer varies as a function of position within the non-homogenous layer. The blend composition may be cast into an electrolyte membrane that can be used to prepare electrochemical cells such as batteries and fuel cells. Advantageously, the spatially varying properties can be spatially tailored to meet the spatially varying requirements of a fuel cell regarding durability and performance.

In a variation, the non-homogeneous polymeric layer has a sheet-like spatial configuration with a first and second spatial dimension that is greater than a third spatial dimension. In a refinement, the weight ratio of first polymer to the second polymer varies as a function of the first and second spatial dimension. Specifically, the weight ratio varies within a plane and is independent of the third direction.

Figure 2A:
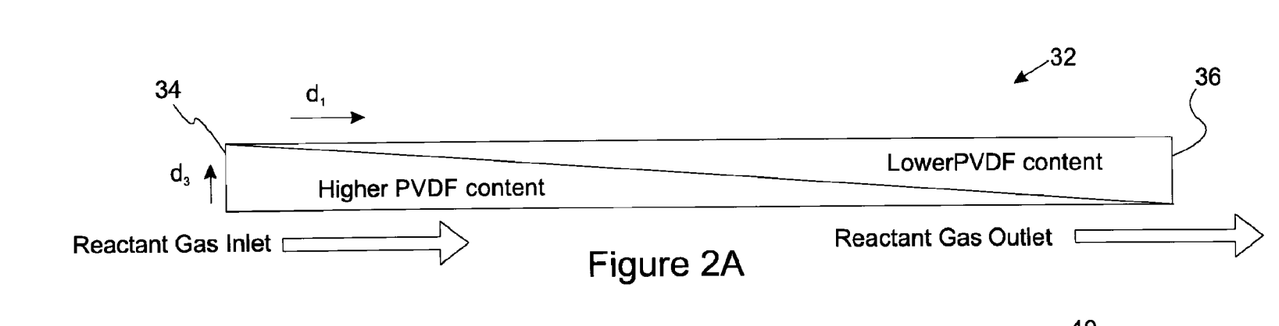
FIG. 2A provides a schematic cross section of a polymer layer having a spatially varying weight ratio of the first and second polymers.
Figure 2B:
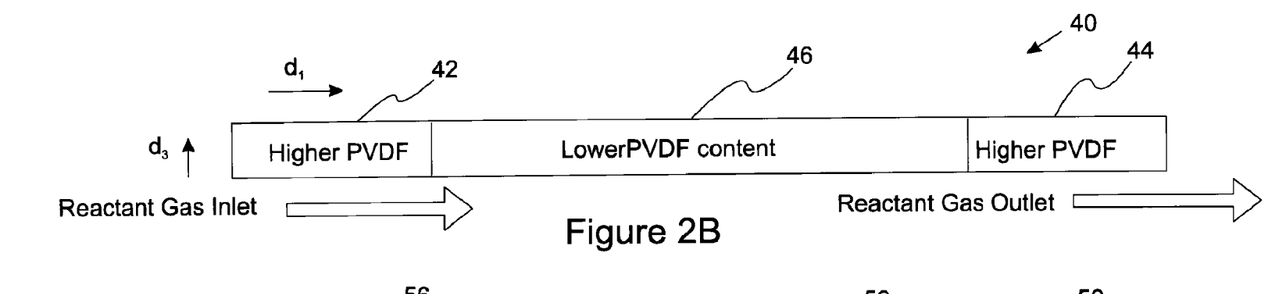
FIG. 2B provides a schematic cross section of a polymer layer having a spatially varying weight ratio of the first and second polymers.
Figure 2C:
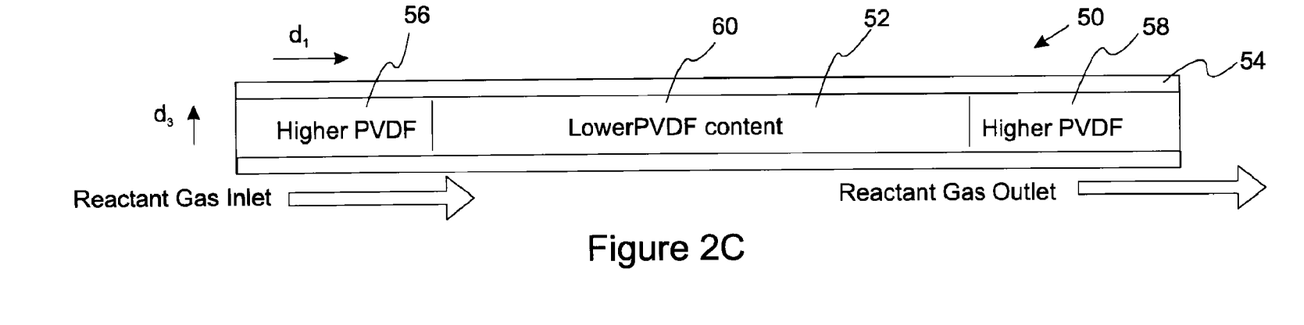
FIG. 2C provides a schematic cross section of a polymer layer having a spatially varying weight ratio of the first and second polymers.

With reference to FIGS. 2A, 2B, and 2C, illustrations of various exemplary examples in which the weight ratio of the first polymer to the second polymer vary in a plane are provided. FIG. 2A provides a schematic cross section of an example in which the amount of the second polymer in polymer structure 32 varies monotonically along direction $d_1$ from location 34 to location 36. In a further refinement, the concentrations are substantially independent of direction $d_3$. In this variation, the higher concentrations of the second polymer are designed to be adjacent to the gas inputs where higher durability is desirable. FIG. 2B provides a schematic cross section of an example in which the amount of the second polymer is higher in the vicinity of the gas inlet and outlet. In this variation polymer structure 40 has higher concentrations of the second polymer at locations 42 and 44 with lower amounts at location 46. FIG. 2C provides a schematic cross section of an example in which the amount of the second polymer is higher in the vicinity of the gas inlet and outlet. In this variation, polymer structure 50 includes polymer layer 52 which is imbibed into porous support 54. Polymer layer 52 has higher concentrations of the second polymer at locations 56 and 58 with lower amounts at location 60. In these figures, direction $d_2$ (not shown) is perpendicular to $d_1$ and $d_3$ such that $d_1$ and $d_2$ define the plane over which the concentrations vary in these variations.

Figure 3:
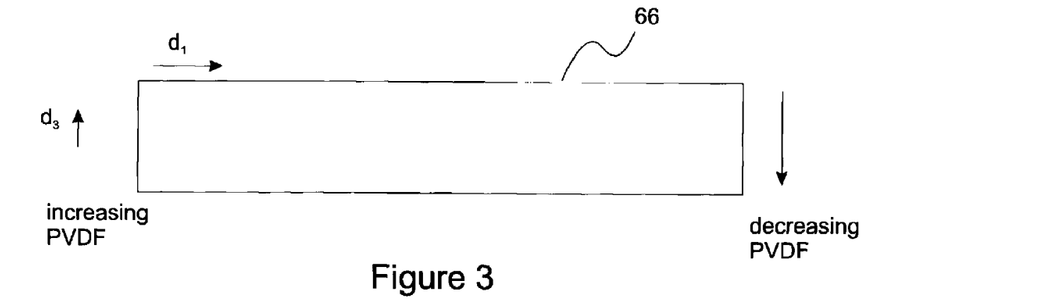
FIG. 3 provides a schematic cross section of a polymer structure in which the second polymer varies through the plane of a layer in the polymer structure.

With reference to FIG. 3, a schematic cross section of a polymer structure in which the second polymer varies as a function of the third spatial dimension is provided. Polymer structure 66 includes the second polymer in a concentration that varies as a function of $d_3$. Direction $d_2$ is perpendicular to $d_1$ and $d_3$ such that $d_1$ and $d_2$ define a plane. In a refinement, the concentrations of the first and second polymer varying only as a function of $d_3$. In another refinement, the concentrations of the first and second polymer varying as a function of $d_3$ and one or both of $d_1$ and $d_2$.

Figure 4A:
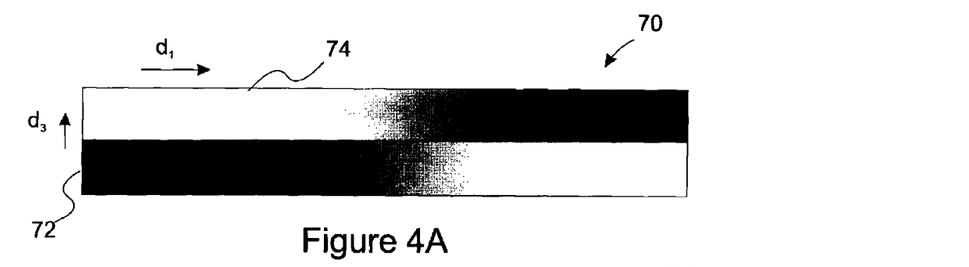
FIG. 4A is a schematic cross section of a multilayer polymer structure.
Figure 4B:
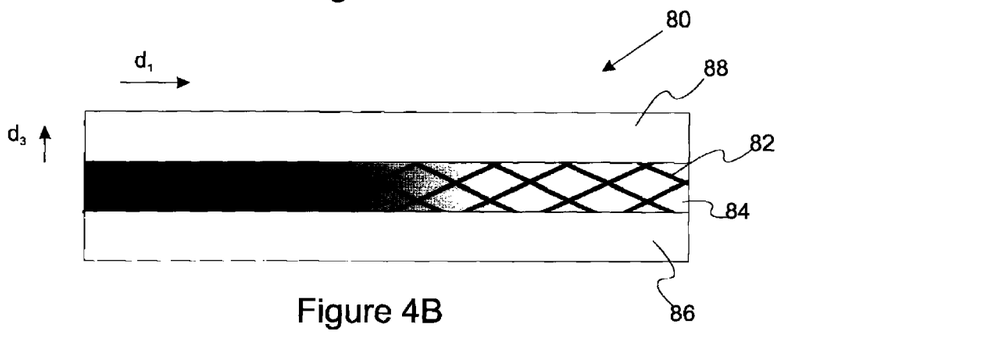
FIG. 4B is a schematic cross section of a multilayer polymer structure.
Figure 4C:
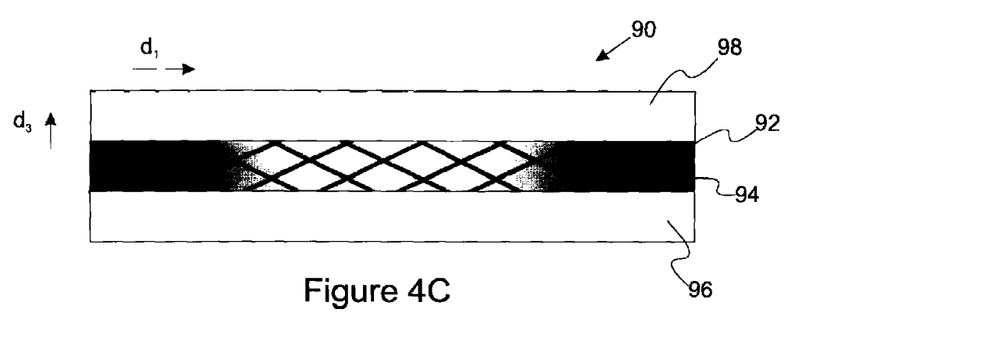
FIG. 4C is a schematic cross section of a multilayer polymer structure.

With reference to FIGS. 4A-C, various exemplary embodiments of multilayer gradient-including polymer structures are provided. FIG. 4A provides polymer structure 70 which includes polymeric layers 72, 74. Each of the polymer layers 72, 74 include a spatially varying weight ratio as set forth above. In the specific example depicted in FIG. 4A, the concentration of the first polymer decreases in polymer layer 72 along direction $d_1$ while in polymer layer 74, the concentration of the first polymer increases along direction $d_1$. FIG. 4B provides a polymer structure which includes an optional porous support layer. Polymer structure 80 includes porous structure 82. Polymer layer 84 is intermingled with porous structure 82. Polymer layer 84 possess a spatially varying weight ratio of the first to second polymer as set forth above. In the specific example depicted in FIG. 4B, the concentration of the first polymer decreases along direction $d_1$. Polymer structure 80 optionally includes one or more additional layers 86, 88. These additional layer will typically also function as ion conductors. Moreover, such layers may also possess a spatially varying weight ratio of the first to second polymers. FIG. 4C provides a polymer structure which includes an optional porous support layer. Polymer structure 90 includes porous structure 92. Polymer layer 94 is intermingled with porous structure 92. Polymer layer 94 possess a spatially varying weight ratio of the first to second polymer as set forth above. In the specific example depicted in FIG. 4C, the concentration of the first polymer is higher at regions near the ends. Polymer structure 90 optionally includes one or more additional layers 96, 98. These additional layer will typically also function as ion conductors. Moreover, such layers may also possess a spatially varying weight ratio of the first to second polymers.

In one refinement, the first polymer is present in an amount from about 1 to about 95 weight percent of the total weight of the polymer blend. In another refinement, the first polymer is present in an amount from about 20 to about 90 weight percent of the total weight of the polymer blend. In another refinement, the first polymer is present in an amount from about 40 to about 80 weight percent of the total weight of the polymer blend. In another refinement, the first polymer is present in an amount from about 5 to about 95 weight percent of the total weight of the polymer blend. In another refinement, the fluoroelastomer is present in an amount from about 5 to about 99 weight percent of the total weight of the polymer blend. In still another refinement, the fluoroelastomer is present in an amount from about 10 to about 80 weight percent of the total weight of the polymer blend. In still another refinement, the fluoroelastomer is present in an amount from about 20 to about 60 weight percent of the total weight of the polymer blend. The first polymer that includes a cyclobutyl moiety may be any such polymer with sufficient ionic conductivity and ion exchange capacity. The first polymer that includes a cyclobutyl moiety may comprise aliphatic or aromatic fluorine containing structure segments that are stable in a wide temperature range and in the harsh chemical environment of an electrochemical cell. The fluorine containing chemical structure also facilitates favorable interaction with the fluoro-elastomer in the blend composition for uniform and intimate mixing. The first polymer that includes a cyclobutyl moiety also comprises an ionic group to provide ionic conductivity and ion exchange capacity. The ionic group may comprise, for example, a hydrocarbon based or fluorocarbon based carboxylic acid, sulfonic acid, sulfonamide, phosphonic acid and their salts. The ionic conductivity of the polymer electrolyte may range from 0.001 siemen/cm to about 10 siemen/cm. In one embodiment, the polymer electrolyte is a copolymer comprising at least one hydrophilic ionic segment and one fluorine containing hydrophobic segment.

In a refinement, the first polymer that includes a cyclobutyl moiety has an ion exchange capacity (IEC) greater than about 0.2 meq/gram (miliequivalent per gram), or preferably, between about 0.5 meq/gram and 4 meq/gram. IEC of a known polymer structure may be calculated by simply dividing the number of sulfonic acid groups per repeating monomer unit by the formula weight of the repeating monomer unit, and multiplying the result by 1000. For polymer electrolyte with unknown degree of sulfonation, IEC can be determined experimentally. The experiment method used here to determine IEC value takes a measured weight of dried polymer electrolyte solid or membrane, and calculates an acid molar equivalent based on the first inflection point of a titration curve near pH 7. Specifically, an electrolyte sample is dried in an oven at about 80° C., optionally under vacuum. After the dried sample is allowed to cool to room temperature in a capped container, the sample is quickly weighed into a titration cup. The sample of known dry weight is then allowed to soak in the titration cup in deionized water before a measured amount of NaCl solution (typically 2.0N concentration) is added. The NaCl solution exchange out the proton ions in the electrolyte to turn the soaking solution acidic. A NaOH solution (typically 0.01N concentration) is used to titrate the NaCl soak solution to pH 7 to determine the amount of proton ions exchanged out of the electrolyte. The molar equivalent of the proton in the solution is then divided by the dry weight of the electrolyte sample, and multiplied by 1000 to yield the IEC value of the sample.

As set forth above, the first polymer includes cyclobutyl moiety. Suitable polymers having cyclobutyl moieties are disclosed in U.S. Pat. Pub. No. 20070099054, U.S. patent application Ser. No. 12,197,530 filed Aug. 25, 2008; Ser. No. 12,197,537 filed Aug. 25, 2008; Ser. No. 12,197,545 filed Aug. 25, 2008; and Ser. No. 12,197,704 filed Aug. 25, 2008; the entire disclosures of which is hereby incorporated by reference. In variation of the present invention, the first polymer comprises polymer segments 1 and 2:

1

2 wherein:
$Z_1$ is a protogenic group such as —SO$_2$X, —PO$_3$H$_2$, —COX, and the like;
$E_1$ is an aromatic containing moiety;
$E_2$ is an unsulfonated aromatic-containing and/or aliphatic-containing moiety;
X is an —OH, a halogen, an ester, or d is the number of $Z_1$ attached to $E_1$. In one refinement, d is equal to the number of aromatic rings in $E_1$. In another refinement, each aromatic ring in $E_1$ can have 0, 1, 2, 3, or 4 $Z_1$ groups;
$P_1$, $P_2$, $P_3$, $P_4$ are each independently: absent, —O—, —S—, —SO—, —CO—, —SO$_2$—, —NR$_1$H—, NR$_2$—, or —R$_3$—, and R$_2$ is C$_{1-25}$ alkyl, C$_{1-25}$ aryl or C$_{1-25}$ arylene;
$R_3$ is C$_{1-25}$ alkylene, C$_{1-25}$ perfluoroalkylene, perfluoroalkyl ether, alkylether, or C$_{1-25}$ arylene;
$R_4$ is trifluoromethyl, C$_{1-25}$ alkyl, C$_{1-25}$ perfluoroalkylene, C$_{1-25}$ aryl, or another $E_1$ group; and
$Q_1$, $Q_2$ are each independently a fluorinated cyclobutyl moiety.

In another variation of the present embodiment, the first polymer comprises segments 3 and 4:

3

4 wherein:
$Z_1$ is a protogenic group such as —SO$_2$X, —PO$_3$H$_2$, —COX, and the like;
$E_1$, $E_2$ are each independently an aromatic-containing and/or aliphatic-containing moiety;
X is an —OH, a halogen, an ester, or d is the number of $Z_1$ attached to $E_1$. In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average;
$P_1$, $P_2$, $P_3$, $P_4$ are each independently: absent, —O—, —S—, —SO—, —CO—, —SO$_2$—, —NH—, NR$_2$—, or —R$_3$—, and
$R_2$ is C$_{1-25}$ alkyl, C$_{1-25}$ aryl or C$_{1-25}$ arylene;
$R_3$ is C$_{1-25}$ alkylene, C$_{1-25}$ perfluoroalkylene, perfluoroalkyl ether, alkylether, or C$_{1-25}$ arylene;
$R_4$ is trifluoromethyl, C$_{1-25}$ alkyl, C$_{1-25}$ perfluoroalkylene, C$_{1-25}$ aryl, or another $E_1$ group;
$R_8(Z_1)_d$ is a moiety having d number of protogenic groups; and
$Q_1$, $Q_2$ are each independently a fluorinated cyclobutyl moiety.

In another variation of the present embodiment, the first polymer comprises segments 5 and 6:

5

6 connected by a linking group $L_1$ to form polymer units 7 and 8:

7

8 wherein:

$Z_1$ is a protogenic group such as —SO$_2$X, —PO$_3$H$_2$, —COX, and the like;

$E_1$ is an aromatic-containing moiety;

$E_2$ is an unsulfonated aromatic-containing and/or aliphatic-containing moiety;

$L_1$ is a linking group;

X is an —OH, a halogen, an ester, or d is a number of $Z_1$ functional groups attached to $E_1$;

$P_1$, $P_2$, $P_3$, $P_4$ are each independently absent, —O—, —S—, —SO—, —SO$_2$—, —CO—, —NH—, NR$_2$—, —R$_3$—, and $R_2$ is C$_{1-25}$ alkyl, C$_{1-25}$ aryl or C$_{1-25}$ arylene;

$R_3$ is C$_{1-25}$ alkylene, C$_{1-25}$ perfluoroalkylene, or C$_{1-25}$ arylene;

$R_4$ is trifluoromethyl, C$_{1-25}$ alkyl, C$_{1-25}$ perfluoroalkylene, C$_{1-25}$ aryl, or another $E_1$ group;

$Q_1$, $Q_2$ are each independently a fluorinated cyclobutyl moiety;

i is a number representing the repetition of polymer segment 1. Typically, i is from 1 to 200; and j is a number representing the repetition of a polymer segment 2. Typically, j is from 1 to 200.

In still another variation of the present embodiment, the first polymer comprises polymer segments 9 and 10:

9

10 wherein:

$Z_1$ is a protogenic group such as —SO$_2$X, —PO$_3$H$_2$, —COX, and the like;

$E_1$, $E_2$ is an aromatic or aliphatic-containing moiety wherein at least one of $E_1$ and $E_2$ include an aromatic substituted with $Z_1$;

X is an —OH, a halogen, an ester, or d is the number of $Z_1$ functional groups attached to $E_1$; In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average;

f is the number of $Z_1$ functional groups attached to $E_2$; In one refinement, f is equal to the number of aromatic rings in $E_2$. In another refinement, each aromatic ring in $E_2$ can have 0, 1, 2, 3, or 4 $Z_1$ groups. In still another refinement, f is an integer from 1 to 4 on average;

$P_1$, $P_2$, $P_3$ are each independently absent, —O—, —S—, —SO—, —SO$_2$—, —CO—, —NH—, NR$_2$—, —R$_3$—, and $R_2$ is C$_{1-25}$ alkyl, C$_{1-25}$ aryl or C$_{1-25}$ arylene;

$R_3$ is C$_{1-25}$ alkylene, C$_{1-25}$ perfluoroalkylene, perfluoroalkyl ether, alkyl ether, or C$_{1-25}$ arylene;

$R_4$ is trifluoromethyl, C$_{1-25}$ alkyl, C$_{1-25}$ perfluoroalkylene, C$_{1-25}$ aryl, or another $E_1$ group; and

$Q_1$ is a fluorinated cyclobutyl moiety, with the proviso that when d is greater than zero, f is zero and when f is greater than zero d is zero.

Example for Q1 and Q2 in the above formulae are:

In each of the formulae 1-10, $E_1$ and $E_2$ include one or more aromatic rings. For example, $E_1$ and $E_2$, include one or more of the following moieties:

Examples of $L_1$ include the following linking groups:

where $R_5$ is an organic group, such as an alkyl or acyl group.

The fluoro-elastomer may be any elastomeric material comprising fluorine atoms. The fluoro-elastomer may comprise a fluoropolymer having a glass transition temperature below about 25° C. or preferably, below 0° C. The fluoro-elastomer may exhibit an elongation at break in a tensile mode of at least 50% or preferably at least 100% at room temperature. The fluoro-elastomer is generally hydrophobic and substantially free of ionic group. The fluoro-elastomer polymer chain may have favorable interaction with the first polymer that includes a cyclobutyl moiety described above. Such favorable interaction may facilitate formation of a stable, uniform and intimate blend of the two materials. The fluoro-elastomer may be prepared by polymerizing at least one fluoro-monomer such as vinylidene fluoride, tetrafluoroethylene, hexafluoropropylene, vinylfluoride, chlorotrifluoroethylene, perfluoromethylvinyl ether, and trifluoroethylene. The fluoro-elastomer may also be prepared by copolymerizing at least one fluoro-monomer and at least one non-fluoro-monomer such as ethylene, propylene, methyl methacrylate, ethyl acrylate, styrene and the like. The fluoro-elastomer may be prepared by free radical polymerization or anionic polymerization in bulk, emulsion, suspension and solution. Examples of fluoro-elastomers include poly(tetrafluoroethlyene-co-ethylene), poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether. Some of the fluoro-elastomers are commercially available from Arkema under trade name Kynar Flex from Solvay Solexis under the trade name Technoflon®, from 3M under the trade name Dyneon®, and from DuPont under the trade name Viton®. For example, Kynar Flex 2751 is a copolymer of vinylidene fluoride and hexafluoropropylene with a melting temperature between about 130° C. and 140° C. The glass transition temperature of Kynar Flex 2751 is about −40 to −44° C. The fluoro-elastomer may further comprise a curing agent to allow crosslinking reaction after blended with a first polymer that includes a cyclobutyl moiety:

| Grade | Form | Melt Temperature, C. |
|---|---|---|
| Kynar Superflex 2500-20 | pellet | 117-125 |
| Kynar Flex 2750-01 | pellet | 130-138 |
| Kynar Flex 2751-00 | powder | 130-138 |
| Kynar Flex 2950-05 | pellet | 130-138 |
| Kynar Flex 2800-00 | pellet | 140-145 |
| Kynar Flex 2801-00 | powder | 140-145 |
| Kynar Flex 2900-04 | pellet | 140-145 |
| Kynar Flex 2800-20 | pellet | 140-145 |
| Kynar Flex 2821-00 | powder | 140-145 |
| Kynar Flex 2850-00 | pellet | 155-160 |
| Kynar Flex 2851-00 | powder | 155-160 |

-continued

| Grade | Form | Melt Temperature, C. |
|---|---|---|
| Kynar Flex 2850-04 | pellet | 155-160 |
| Kynar Flex 3120-10 | pellet | 161-168 |
| Kynar Flex 3121-10 | powder | 161-168 |
| Kynar Flex 3120-50 | pellet | 161-168 |
| Kynar Flex 3121-50 | powder | 161-168 |

The first polymer that includes a cyclobutyl moiety and the fluoro-elastomer may be blended together to form a blend composition using any polymer blending methods. The first polymer that includes a cyclobutyl moiety and the fluoro-elastomer may be heated up to a sufficiently high temperature to form polymer melt and mixed in their molten state in a reactor, an extruder or in melt film casting equipment. The first polymer that includes a cyclobutyl moiety and the fluoro-elastomer may be dissolved in an organic solvent or a solvent mixture to form a mixture in solution. The solvent is subsequently evaporated or washed away in a film casting process, resulting in a membrane of the blend composition. Alternatively, the fluoro-elastomer may be dissolved in a solvent that is capable of swelling but not dissolving the first polymer that includes a cyclobutyl moiety. Upon contacting the fluorine containing polymer electrolyte membrane or solid, the fluoro-elastomer solution is able to diffuse into the electrolyte membrane or solid. A blend composition can be obtained after removal of the solvent. The blend composition may be further heated to a temperature below the melting temperature of either component, or immersed in water at room temperature or elevated temperatures (in boiling water, for example) to facilitate the formation of a desired blend morphology for improved mechanical and/or electrochemical properties. Additionally, the first polymer that includes a cyclobutyl moiety and the fluoro-elastomer may be blended through sequential polymerization of their corresponding monomers in the same reaction medium. The blend composition can also be obtained by mixing fine dispersions or emulsions of the corresponding fluoro-elastomer and polymer electrolyte. The mixed dispersion or emulsion can be subsequently cast into a membrane or film of the blend composition.

Many organic and inorganic solvents may be used to dissolve, swell or disperse the first polymer that includes a cyclobutyl moiety and the fluoro-elastomer. Non-limitation solvents may include tetrahydrofuran, methyl ethyl ketone, dimethylformamide, dimethylacetamide, tetramethyl urea, dimethylsulfoxide, trimethyl phosphate, and N-methylpyrrolidone. The above solvents may also be mixed with water, alcohols, esters or ethers to form mixed solvents. Certain latent solvents or swelling solvents may also be used. The latent solvents may include, but not limited to, acetone, methyl isobutyl ketone, di-isobutyl ketone, glycerol ethers, glycerol ether esters, n-butyl acetate, cyclohexanone, diacetone alcohol, butyrolactone, isophorone, propylene carbonate, and dimethyl phthalate.

The blend composition may be configured to form an intimate blend where the two components (the first polymer that includes a cyclobutyl moiety and the fluoro-elastomer) distribute relatively uniformly throughout the mixture at a microscopic level. In other words, any individual domain or material phase of each component in the blend is typically less than about 10 micrometers, or preferably less than about 0.5 micrometer. The two components may or may not be completely compatible or thoroughly mixed at the individual molecule level in the intimate blend. The two components may segregate into different microscopic domains. In one embodiment, the first polymer that includes a cyclobutyl moiety comprises a fluorine containing hydrophobic segment and a hydrophilic ionic segment. The hydrophilic ionic segment of the first polymer that includes a cyclobutyl moiety electrolyte forms a continuous network throughout the intimate blend to provide a continuous passage way for ionic conduction. The hydrophobic segment of the first polymer that includes a cyclobutyl moiety has favorable interaction with the fluoro-elastomer molecule. The hydrophobic segment of the polymer electrolyte may associate strongly with the fluoro-elastomer. The hydrophobic segment of the polymer electrolyte may be compatible with the fluoro-elastomer molecule such that they exist in one phase in the intimate blend.

The ratio of first polymer that includes a cyclobutyl moiety to fluoro-elastomer in the blend composition depends on the nature of the polymer electrolyte and the fluoro-elastomer. For a blend composition with desirable mechanical and humidity stabilities, the fluoro-elastomer may account for a significant portion or even majority portion of the blend composition. For a blend composition with desirable high ionic conductivity and moderate mechanical stability, the fluoro-elastomer may account for a small to moderate portion of the blend. When first polymer that includes a cyclobutyl moiety and Kynar Flex 2751 are mixed to form a blend composition, for example, an effectively high ionic conductivity can be achieved at Kynar Flex 2751 content between about 10% and about 50% by weight in the blend composition.

The blend composition may be formed into a membrane by any methods known to an ordinary skill in the art. The membrane may be formed, for example, by melt casting, spin coating, solution casting, extrusion casting, calendaring, spray coating, blow molding, fixed gap coating, hot press and the like. The thickness of the film may be from a few micrometers to about 200 micrometers.

Figure 5:
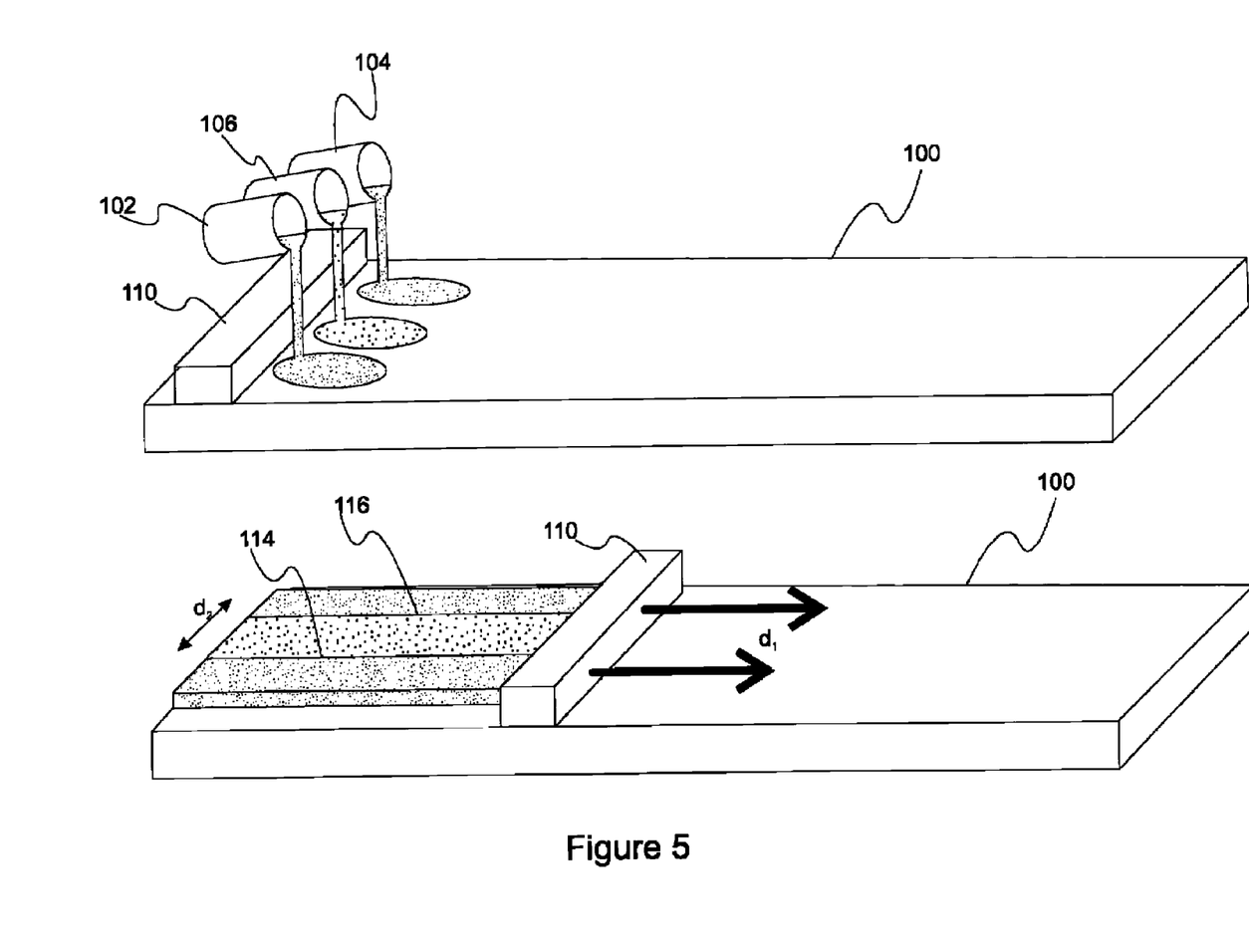
FIG. 5 is a schematic illustration showing an example of a method for forming a gradient film in a plane.

With reference to FIG. 5, a schematic illustration showing an example of a method for forming a gradient film in a plane. In this example, polymer compositions 102, 104, 106 are poured onto glass plate 100.

Polymer compositions 102 and 104 are characterized by a different ratio of the first to second polymers than the ratio characterizing composition 106.

Coating blade 110 is drawn along direction $d_1$ to coat out membrane 112.

Mixing of the compositions along edges 114, 116 produces a composition gradient along direction $d_1$. The resulting membrane is dried and removed.

The membrane of the blend composition exhibits good mechanical and electrochemical stability under wide range of humidity conditions. The membrane typically has a controlled amount of swelling in boiling water. The amount of volume swelling (percentage increase in volume after a dry membrane is immersed in boiling water for about 1 hour) may range from about 10% to about 350%, or preferably from about 60% to about 200%. Swelling of a dry membrane in boiling water can also be measured by the percentage increase in membrane length. The electrolyte membrane of the blend composition also exhibits sufficient amount of elongation before break to accommodate the volume expansion or shrinking due to a large swing of relative humidity. The electrolyte membrane typically has an elongation at break greater than about 50%, or preferably greater than about 100%. The elongation at break is typically measured at room temperature and 50% relative humidity in the length direction of the membrane under tensile mode. The stability of the electrolyte membrane under wide range of different humidity conditions may be described by a humidity stability factor, Fx. Humidity stability factor (Fx) herein is referred to as the ratio of the percentage increase in length of a dry membrane after being immersed in boiling water for about 1 hour, to the percentage elongation at break of the dry membrane measured at room temperature at 50% relative humidity in the length direction under tensile mode. In general, the greater the humidity stability factor, the greater the stability of the electrolyte membrane under wide range of humidity conditions. The humidity stability factor of the electrolyte membrane is typically greater than 1.0. The electrolyte membrane with Fx greater than 5, or preferably greater than about 10 are also obtained.

The ion exchange capacity of the electrolyte membrane comprising the blend composition may range from about 0.01 to about 4 meq/gram, or preferably from 0.2 to about 3.0 meq/gram. The ionic conductivity of the electrolyte membrane may range from about 0.001 siemen/cm to about 2 siemen/cm depending on the relative humidity.

An anode and a cathode can be deposited or laminated to the opposite sides of the electrolyte membrane of the blend composition to form a membrane electrode assembly. The anode and cathode may comprise a conductive particle, a catalyst and optionally a polymer electrolyte. The conductive particle may include carbon black, Vulcan carbon (such as Vulcan XC-72), acetylene black, carbon nanotube, graphite, Black Pearls 2000, and Ketjen Black. The catalyst may include metal, metal alloy and metal oxides of platinum, ruthenium, and palladium. Any membrane electrode assembly manufacturing processes may be used to prepare the membrane electrode assembly.

The following examples illustrate the various embodiments of the present invention. Those skilled in the art will recognize many variations that are within the spirit of the present invention and scope of the claims.

SYNTHESIS OF SULFONATED PFCB-2500

In a 1 L flask, 25 g (42 mmol BPVE) of perfluorocyclobutane polymer (2:1 ratio of BPVE oligomer (Mn=8K) to 6F monomer, Mn=50K) is dissolved in 500 g of dichloromethane at 36° C. internal temperature. Chlorosulfonic acid (62.5 g, 2.5 wt eq., 12.8 mol eq) is added to reaction mixture and stirred mechanically maintaining an internal temperature at 36° C. After 15-20 minutes the purple sulfonated PFCB polymer precipitates and the supernatant dichloromethane (>99.9%, Aldrich, cat#439233) is decanted after 1 hour. The collected precipitate is blended and washed thoroughly with deionized water and stirred in boiling deionized water for 1 hr. The collected ionomer is washed and dried in vacuum oven at 60° C. for 16 hrs.

SYNTHESIS OF SULFONATED PFCB-4000 (Mn 90K)

In a 500 mL flask, 10 g of perfluorocyclobutane polymer (10 g, 21 mmol BPVE) is dissolved in 200 g of dichloromethane (>99.9%, Aldrich, cat#439233) at ambient temperature. Chlorosulfonic acid (42.7 g, 4.27 wt eq., 21.8 mol eq) is added to reaction mixture and homogenized at room temperature using an IKA TR-25 with a 17 mm diameter generator containing 2 mm wide windows. The temperature increases to reflux after 20 minutes as the precipitated purple sulfonated PFCB polymer is homogenized at 4K-12K RPM and maintained for up to 2 hours. The reaction mixture is poured to 2 L of DI water and blended in a Waring blender to chop the polymer. The filtered fibrous product is washed thoroughly with DI water and stirred in boiling DI water for 1 hr. The collected ionomer is washed and dried in vacuum oven at 60° C. for 16 hrs.

PREPARATION OF PFCB-4000 SOLUTION AND PFCB-2500

A 7.5 wt % solution is prepared by dissolving 10 g of the sulfonated polymer in 123.4 grams of N,N-dimethylacetamide (>99.9%, Aldrich, cat#270555) at 50° C. over a period of 2 hours. The solution is homogenized at 15,000 rpm for a few minutes.

PREPARATION OF KF-2751 ELASTOMER SOLUTION

A 15 wt % solution of Kynar® vinylidene fluoride resin, grade 2751-00 (Arkema, Lot#03C8106) is prepared by dissolving 20 g of the elastomer powder in 113.3 grams of N,N-dimethylacetamide (>99.9%, Aldrich, cat#270555) by rolling in a jar at room temperature overnight.

PREPARATION OF BLEND SOLUTION

An ionomer/elastomer blended solution ire prepared by mixing a N,N-dimethylacetamide solution of PFCB-4000 or PFCB-2500 (30g, 7.5 wt %) with a N,N-dimethylacetamide of KF-2751 (10 g, 15 wt %) and homogenizing at 20,000 RPM twice for 3 minute intervals to yield clear yellow solutions. The solution is filtered through 5 micron Mitex™ membrane PTFE filters using high pressure directly into centrifuge tubes. The tubes are capped and spun for 10 minutes at 3,000 rpm to remove air bubbles.

PREPARATION OF N,N-dimethylacetamide NAFION 1000 SOLUTION

DuPont Nafion® DE2020 solution (10 g, ~20 wt % solids) is added slowly with stirring to 10 g of N,N-dimethylacetamide and rolled in a screw cap vial for 30 minutes. The solution is centrifuged to for 10 minutes at 3,000 rpm to remove air bubbles.

PREPARATION OF COMPARATIVE PFCB MEMBRANES

Comparative Example 1

On an Erichson casting table set at 80° C., sheet of window pane glass is placed on the vacuum table. The surface is wiped clean with iso-propanol and a 80:20 PFCB-2500/PVDF blended ionomer solution is coated at a blade gap of 10 mil at a draw speed of 12.5 mm/s at 50° C. Drying continued at 80° C. for 20 minutes and the membranes are cut away in 10 cm×10 cm sections for characterization.

Comparative Example 2

On an Erichson casting table set at 80° C., sheet of window pane glass is placed on the vacuum table. The surface is wiped clean with iso-propanol and a 50:50 PFCB-2500/PVDF blended ionomer solution is coated at a blade gap of 10 mil at a draw speed of 12.5 mm/s at 50° C. Drying continued at 80° C. for 20 minutes and the membranes are cut away in 10 cm×10 cm sections for characterization.

Comparative Example 3

On an Erichson casting table set at 50° C., a legal size sheet of paper is placed on the vacuum table covered by a sheet of extruded PTFE (47 mm, supplied by clean room), the table vacuum is applied and the corners of the PTFE sheet are taped, pulled taught and any wrinkles are smoothed out using a lab towel. The surface is wiped clean with iso-propanol and two strips of PEN with an adhesive (66 mm total) are placed smoothly on the extruded PTFE at a width of 23 cm. Separately, an embroidery frame holding a 16 inch wide porous PTFE (Donaldson 1326, 17 micron base thickness) is pretreated with a 0.5 wt % solution of DuPont DE 2020 Nafion® solution by placing the D-1326 onto a 5 mil wet coating on a polyethylene sheet. The wet support is allowed to dry over 10 minutes under ambient conditions and removed from the polyethylene sheet to yield a hydrophilic opaque porous PTFE support. The PFCB-4000/PVDF blended ionomer solution is coated at a blade gap of 5 mil at a draw speed of 12.5 mm/s at 50° C. Upon reaching the end of the coater, the treated porous PTFE support is placed in contact with the wet coating from an edge. The wet solution pulls the support down onto the solution filling the pores from the bottom pushing all the air out. Immediately after the porous support is completely filled, the long edges are guided gently over the edge of the tape to pull all the creases from the wet support. After 10 minutes the film is dry and a 1 mil PEN film is placed on top of the previous layers, overtop of the PTFE support, to facilitate gliding the bird bar for the second coat. The frame is cut away carefully to not remove the extruded PTFE from the coater. A second coating of the same PFCB-4000/PVDF blend solution at ~4 wt % is laid out using at a 3 mil bird bar. Drying is continued at 50° C. and the membranes are cut away in 10 cm×10 cm sections for characterization.

PREPARATION OF MULTILAYER PFCB MEMBRANES

Multilayer Example 1

On an Erichson casting table set at 80° C., a sheet of window pane glass is placed on the vacuum table. The surface is wiped clean with iso-propanol and a 80:20 PFCB-2500/PVDF blended ionomer solution is coated at a blade gap of 5 mil at a draw speed of 12.5 mm/s at 80° C. After 10 minutes the film is dry and a 50:50 PCFB-2500/PDVF is coated at a blade gap of 5 mil at the same draw speed. Drying continued at 80° C. for 10 minutes and the membranes are cut away in 10 cm×10 cm sections for characterization.

Gradient Example 1

This example is illustrated in FIG. 5. On an Erichson casting table set at 80° C., a sheet of window pane glass is placed on the vacuum table. The surface is wiped clean with iso-propanol and a 80:20 PFCB-2500/PVDF blended ionomer solution is poured in the middle of the window pane at the start of the coating bar. A second solution of 50:50 PFCB-2500/PDVF is poured on either side of the first solution such that upon drawing the coating blade at a draw speed of 12.5 mm/s the solutions mix to give a single wet solution with a graded amount of PVDF. After 20 minutes the membrane is dry and removed for characterization.

PREPARATION OF PFSA SANDWICH PFCB MEMBRANES

Sandwich Example 1

On an Erichson casting table set at 80° C., a legal size sheet of paper is placed on the vacuum table covered by a sheet of extruded PTFE (47 mm, supplied by clean room), the table vacuum is applied and the corners of the PTFE sheet are taped, pulled taught and any wrinkles are smoothed out using a lab towel. The surface is wiped clean with iso-propanol and two strips of PEN with an adhesive (66 mm total) are placed smoothly on the extruded PTFE at a width of 23 cm. A 2 micron dry film of Nafion DE2020 is cast from commercial stock solution and dried at 80° C. The PFCB/PVDF blended ionomer solution is coated at a blade gap of 5 mil at a draw speed of 12.5 mm/s at 50° C. After 10 minutes, a third coating of Nafion DE2020 from 1:1 DMAc:alcohol solution at ~5 wt % is laid out using at a 3 mil bird bar. Drying is continued at 80° C. and the membranes are cut away in 10 cm×10 cm sections for characterization.

PREPARATION OF PFSA SANDWICH SUPPORTED MEMBRANES

Sandwich Example 2

On an Erichson casting table set at 50° C., a legal size sheet of paper is placed on the vacuum table covered by a sheet of extruded PTFE (47 mm, supplied by clean room), the table vacuum is applied and the corners of the PTFE sheet are taped, pulled taught and any wrinkles are smoothed out using a lab towel. The surface is wiped clean with iso-propanol and two strips of PEN with an adhesive (66 mm total) are placed smoothly on the extruded PTFE at a width of 23 cm. Separately, an embroidery frame holding a 16 inch wide porous PTFE (Donaldson 1326, 17 micron base thickness) is pretreated with a 0.5 wt % solution of DuPont DE 2020 Nafion® solution by placing the D-1326 onto a 5 mil wet coating on a polyethylene sheet. The wet support is allowed to dry over 10 minutes under ambient conditions and removed from the polyethylene sheet to yield a hydrophilic opaque porous PTFE support. A 2 micron dry film of Nafion DE2020 is cast from commercial stock solution and dried at 50° C. The PFCB/PVDF blended ionomer solution is coated at a blade gap of 5 mil at a draw speed of 12.5 mm/s at 50° C. Upon reaching the end of the coater, the treated porous PTFE support is placed in contact with the wet coating from an edge. The wet solution pulls the support down onto the solution filling the pores from the bottom and pushing all the air out. Immediately after the porous support is completely filled, the long edges are guided gently over the edge of the tape to pull all the creases from the wet support. After 10 minutes the film is dry and a 1 mil PEN film is placed on top of the previous layers, overtop of the PTFE support, to facilitate gliding the bird bar for the second coat. The frame is cut away carefully to not remove the extruded PTFE from the coater. A third coating of Nafion DE2020 from 1:1 DMAc:alcohol solution at ~4 wt % is laid out using at a 3 mil bird bar. Drying is continued at 50° C. and the membranes are cut away in 10 cm×10 cm sections for characterization.

FABRICATION OF 53 cm2 MEMBRANE ELECTRODE ASSEMBLY

Performance and Accelerated Chemical—Mechanical Durability Build Conditions

A bonded MEA is prepared for performance testing by hot pressing anodes with 0.05 mg/cm2 Pt loading and a cathode with a 0.40 mg/cm2 Pt loading. The MEA is hot pressed at 120° C. for 2 minutes at 4000 lbs.

Results

Figure 6:
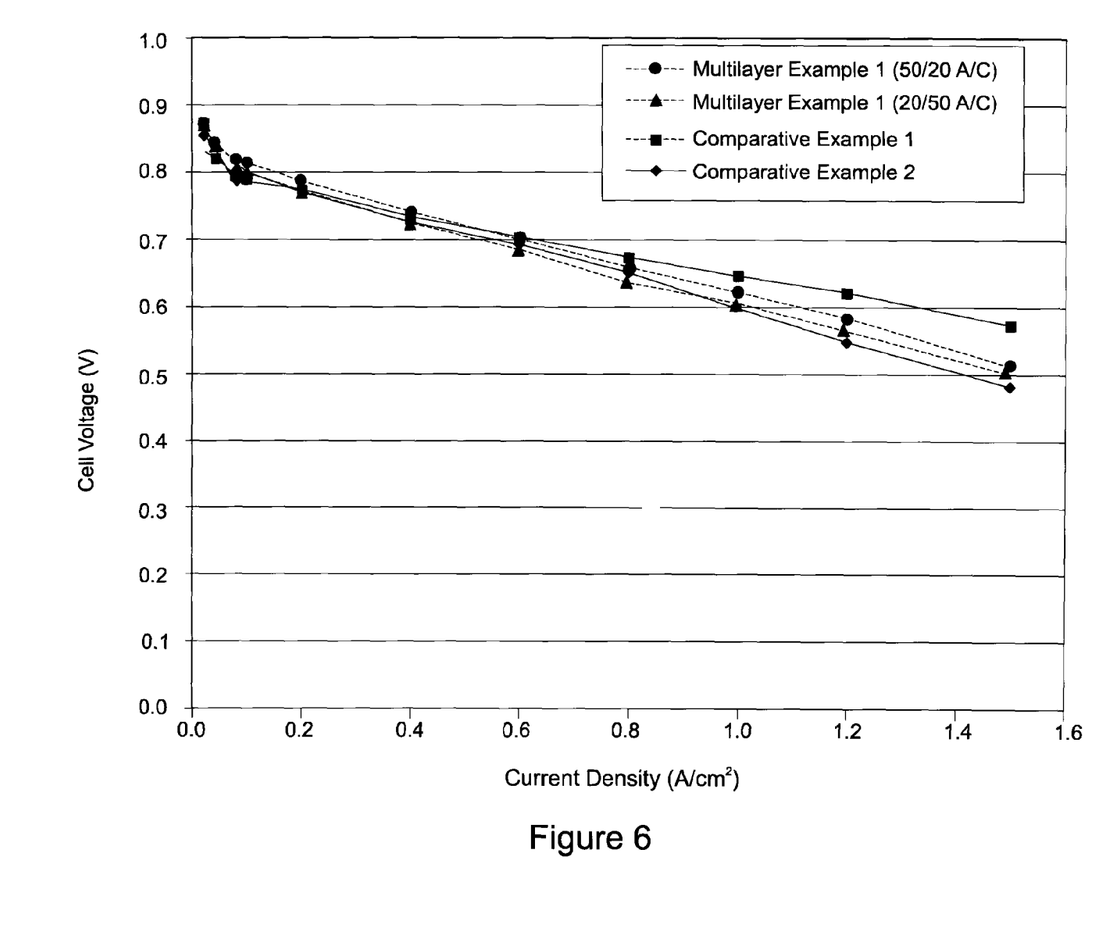
FIG. 6 provides voltage versus current plots for polymeric structures used as fuel cell ion conductors.

FIG. 6 provide performance information for the multilayer structures. It is observed that the preparation of multilayers can provide a performance boost at 80° C., 85% RHout to a mechanically stabilized membrane. Comparative Example 1 provides <300 Relative Humidity cycles from 0-150% RH at 80 C, while Comparative Example 2 was >9000 cycles. The preparation of multilayer 1, comprising a layer of the 80:20 PFCB-2500:PVDF and 50:50 PFCB-2500:PVDF shows improved performance against Comparative Example 2 when run as either the 20% to the anode (20/50 A/C) or 50% to the anode (50/20 A/C) and provides evidence that a trade-off between mechanical durability and performance can be used to optimize the proton exchange membrane.

Figure 7:
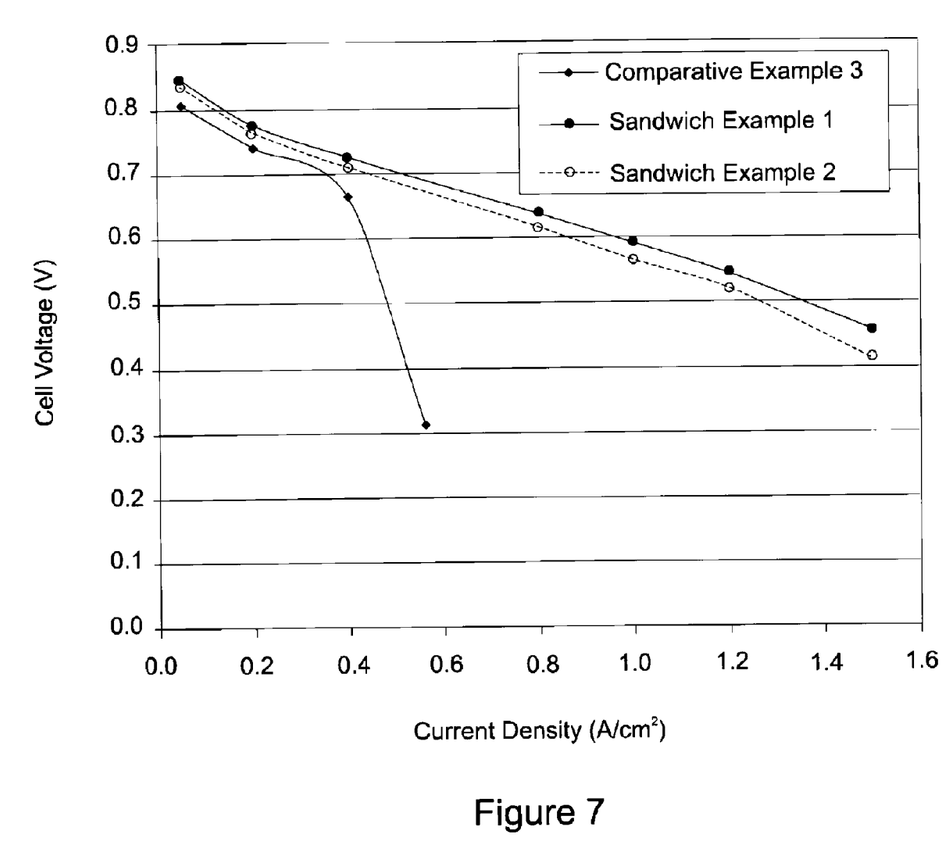
FIG. 7 provides voltage versus current plots for polymeric structures used as fuel cell ion conductors.

FIG. 7 provides performance information for the sandwich structures set forth above. This figure illustrates the importance of the integration of PFSA skins onto PFCB/PVDF based proton exchange membranes. The dry fuel cell conditions of 95° C., 55% RH out are difficult operating conditions as shown by Comparative Example 3, where a 10 micron supported PFCB-4000:PVDF proton exchange membrane, begins to decline beyond 0.4 A/cm². The same membrane with 2 micron PFSA skins on both the sides provides a tremendous performance boost in Sandwich Example 1, a 16 micron unsupported membrane. Sandwich Example 2, shows improved performance at 8 micron in a support, owing to the importance of having PFSA skins present.

The above description of embodiments of the invention is merely exemplary in nature and, thus, variations thereof are not to be regarded as a departure from the spirit and scope of the invention.

What is claimed is:

1. A polymeric structure comprising:
   a non-homogenous polymeric layer including:
      a first polymer comprising cyclobutyl moiety; and
      a second polymer having a non-ionic polymer segment, wherein the weight ratio of first polymer to the second polymer varies as a function of position within the non-homogenous layer.

2. The polymeric structure of claim 1 wherein the non-homogeneous polymeric layer has a sheet-like spatial configuration with a first and second spatial dimension that is greater than a third spatial dimension.

3. The polymeric structure of claim 2 wherein the weight ratio of first polymer to the second polymer varies as a function of the first and second spatial dimension.

4. The polymeric structure of claim 2 wherein the weight ratio of first polymer to the second polymer varies as a function of the third spatial dimension.

5. The polymeric structure of claim 1 wherein the first polymer includes one or more functional groups selected from the group consisting of —SO₃H, COOH, PO₃H₂, and combinations thereof.

6. The polymeric structure of claim 1 wherein the first polymer comprises polymer segments 1 and 2:

$$[E_1(Z_1)_d]\text{—}P_1\text{-}Q_1\text{-}P_2 \qquad 1$$

$$E_2\text{-}P_3\text{-}Q_2\text{-}P_4 \qquad 2$$

wherein:
   $Z_1$ is a protogenic group;
   $E_1$ is an aromatic containing moiety;
   $E_2$ is an unsulfonated aromatic-containing and/or aliphatic-containing moiety;
   X is an —OH, a halogen, an ester, or

$d$ is the number of $Z_1$ attached to $E_1$;
$P_1$, $P_2$, $P_3$, $P_4$ are each independently: absent, —O—, —S—, —SO—, —CO—, —SO₂—, —NR₁H—, NR₂—, or —R₃—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$, $Q_2$ are each independently a fluorinated cyclobutyl moiety.

7. The polymeric structure of claim 1 wherein the first polymer includes polymer segments 3 and 4:

$$E_1\text{—}P_1\text{—}Q_1\text{—}P_2 \atop | \atop R_8(Z_1)_d \qquad 3$$

$$E_2\text{—}P_3\text{—}Q_2\text{—}P_4 \qquad 4$$

wherein:
   $Z_1$ is a protogenic group;
   $E_1$, $E_2$ are each independently an aromatic-containing and/or aliphatic-containing moiety;
   X is an —OH, a halogen, an ester, or $d$ is the number of $Z_1$ attached to $E_1$;
$P_1$, $P_2$, $P_3$, $P_4$ are each independently: absent, —O—, —S—, —SO—, —CO—, —SO₂—, —NH—, NR₂—, or —R₃—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$R_8(Z_1)_d$ is a moiety having $d$ number of protogenic groups; and
$Q_1$, $Q_2$ are each independently a fluorinated cyclobutyl moiety.

8. The polymeric structure of claim 2 wherein the first polymer comprises polymer segments 5 and 6:

$$E_1(Z_1)_d\text{—}P_1\text{-}Q_1\text{-}P_2 \qquad 5$$

$$E_2\text{-}P_3\text{-}Q_2\text{-}P_4 \qquad 6$$

connected by a linking group $L_1$ to form polymer units 7 and 8:

$$\text{—}(E_2\text{-}P_3\text{-}Q_2\text{-}P_4)_j\text{-}L_1\text{-}(E_1(Z_1)_d\text{—}P_1\text{-}Q_1\text{-}P_2)_i\text{—} \qquad 7$$

$$\text{—}(E_1(Z_1)_d\text{—}P_3\text{-}Q_2\text{-}P_4)_j\text{-}L_1\text{-}(E_2\text{-}P_1\text{-}Q_1\text{-}P_2)_i\text{—} \qquad 8$$

wherein:
$Z_1$ is a protogenic group;
$E_1$ is an aromatic-containing moiety;
$E_2$ is an unsulfonated aromatic-containing and/or aliphatic-containing moiety;
$L_1$ is a linking group;
X is an —OH, a halogen, an ester, or d is a number of $Z_1$ functional groups attached to $E_1$;
$P_1$, $P_2$, $P_3$, $P_4$ are each independently absent, —O—, —S—, —SO—, —SO$_2$—, —CO—, —NH—, NR$_2$—, —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$Q_1$, $Q_2$ are each independently a fluorinated cyclobutyl moiety;
i is a number representing the repetition of polymer segment 5; and
j is a number representing the repetition of a polymer segment 6.

9. The polymeric structure of claim 2 wherein the first polymer includes polymer segments 9 and 10:

$$E_1(Z_1)_d\text{—}P_1\text{-}Q_1\text{-}P_2 \qquad 9$$

$$E_2(Z_1)_f\text{—}P_3 \qquad 10$$

wherein:
$Z_1$ is a protogenic group;
$E_1$, $E_2$ are each independently an aromatic or aliphatic-containing moiety wherein at least one of $E_1$ and $E_2$ include an aromatic substituted with $Z_1$;
X is an —OH, a halogen, an ester, or d is the number of (SO$_2$X) functional groups attached to $E_1$;
f is the number of (SO$_2$X) functional groups attached to $E_2$;
$P_1$, $P_2$, $P_3$ are each independently absent, —O—, —S—, —SO—, —SO$_2$—, —CO—, —NH—, NR$_2$—, —R$_3$—, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkyl ether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$ is a fluorinated cyclobutyl moiety,
with the proviso that when d is greater than zero, f is zero and when f is greater than zero d is zero.

10. The polymeric structure of claim 1 wherein the second polymer is a fluoroelastomer.

11. The polymeric structure of claim 10 wherein the fluoroelastomer is selected from the group consisting of poly(tetrafluoroethlyene-co-ethylene), poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether.

12. The polymeric structure of claim 1 wherein the second polymer comprises a copolymer of vinylidene fluoride and hexafluoropropylene.

13. A polymeric structure comprising:
a porous structure; and
a non-homogenous polymeric layer including:
a first polymer comprising cyclobutyl moiety; and
a second polymer having a non-ionic polymer segment, the non-homogenous polymeric layer being intermingled with the porous structure, wherein the weight ratio of first polymer to the second polymer varies as a function of position within the non-homogenous layer.

14. The polymer structure of claim 13 further comprises at least one additional polymer layer.

15. The polymer structure of claim 13 wherein the porous structure is a porous polymer layer.

16. The polymeric structure of claim 13 wherein the non-homogeneous polymeric layer has a sheet-like spatial configuration with a first and second spatial dimension that is greater than a third spatial dimension.

17. The polymeric structure of claim 16 wherein the weight ratio of first polymer to the second polymer varies as a function of the first and second spatial dimension.

18. The polymeric structure of claim 16 wherein the weight ratio of first polymer to the second polymer varies as a function of the third spatial dimension.

19. A polymeric structure comprising:
a first non-homogenous polymeric layer including:
a first polymer comprising cyclobutyl moiety; and
a second polymer having a non-ionic polymer segment, wherein the weight ratio of first polymer to the second polymer varies as a function of position within the first non-homogenous layer; and
a second non-homogenous polymeric layer disposed over the first non-homogenous polymeric layer, the second non-homogenous polymeric layer including:
a third polymer comprising cyclobutyl moiety; and
a fourth polymer having a non-ionic polymer segment, wherein the weight ratio of third polymer to the fourth polymer varies as a function of position within the second non-homogenous layer.

20. A polymeric structure comprising:
a first polymeric layer;
a second polymeric layer disposed over the first polymeric layer, the second polymeric layer including:
a first polymer comprising cyclobutyl moiety; and
a second polymer having a non-ionic polymer segment, wherein the weight ratio of first polymer to the second polymer varies as a function of position within the second polymeric layer; and
a third polymeric layer disposed over the second polymeric layer.

* * * * *